FOLDED BELT RECORD MACHINE

Filed June 18, 1954 2 Sheets-Sheet 1

INVENTORS
Edward S. Gillette
Ralph H. Sherman, Jr.
BY Curtis, Morris & Safford
ATTORNEYS Dec. 23, 1958 E. S. GILLETTE ET AL 2,865,639

FOLDED BELT RECORD MACHINE

Filed June 18, 1954 2 Sheets-Sheet 2

INVENTORS
Edward S. Gillette
Ralph H. Sherman, Jr.

BY Curtis, Morris & Safford
ATTORNEYS

United States Patent Office 2,865,639

Patented Dec. 23, 1958

2,865,639

FOLDED BELT RECORD MACHINE

Edward S. Gillette, Bridgeport, and Ralph H. Sherman, Jr., Fairfield, Conn., assignors to Dictaphone Corporation, Bridgeport, Conn., a corporation of New York Application June 18, 1954, Serial No. 437,829

6 Claims. (Cl. 274—11)

This invention relates to signal recording and reproducing machines, and more particularly to such machines using relatively wide, endless tape records to provide long periods of recording.

An object of this invention is to provide improved machines of this type, and especially improved mechanism for the handling of such tape records in such machines.

A more specific object is to provide for a novel, simple, trouble-free arrangement for handling relatively wide and long endless belt records to permit many hours of recording to be made and stored in small space.

Two general types of tape record signal recording systems are widely popular at the present time. The first of these is the linear tape record system wherein a two-ended length of recording tape stored on a supply reel is fed from this reel past a record or reproduce head to a take-up reel to be temporarily stored thereon as the supply reel is being unwound. After the entire record has been reproduced, the tape is then rewound onto the original supply reel. A particular disadvantage of this system is the difficulty of handling and using a two-ended length of tape which is especially accentuated when the tape is long enough for many hours of recording.

The second widely-popular tape record system obviates this difficulty by using an endless belt record. In one particular embodiment of this second system, a relatively short wide belt is stretched taut over a drum or rollers to move it relative to a recording head which is being moved transversely to the direction of motion of the record tape. The resulting motion of the tape and recording head defines a helical path on the record closely spaced in pitch across the width thereof. If such a belt record is to be stretched taut throughout its length, to handle a relatively long record the record-supporting mechanism must either be very large or very complex, and is therefore not very satisfactory.

An obvious alternative arrangement for accommodating a relatively long belt record is to let it be slack for part of its length with the slack part stored in some convenient way. So far as is known, however, until the present invention no really simple, efficient and completely reliable means for handling and storing a partly slack tape-like belt record has been devised. Among the difficulties encountered in any such system are the tendency of the slack part of the record to tangle itself, the impossibility of exerting a substantial pushing force on material as flexible as tape record, and the tendency of such a slack tape record to pass by the record head with uneven speed and in inaccurate position.

The present invention is intended to overcome such disadvantages of these linear record and belt record systems. It seeks to do so by means which are inexpensive but which nonetheless provide faultless recording and reproduction. In accordance with the present invention, in one specific embodiment thereof, a relatively long endless belt record is stretched taut for only part of its length by an arrangement which drives this portion with uniform speed and exact alignment past a record head. Most of the remainder of the record is stored in accordion-pleated folds in a simplified storage device which insures that the belt record remains uniformly and evenly folded as it passes continuously through this storage arrangement. Further details of this embodiment, together with a better understanding of the general nature of the invention will best be gained, however, from a study of the following detailed description given in connection with the drawings in which:

Figure 1:
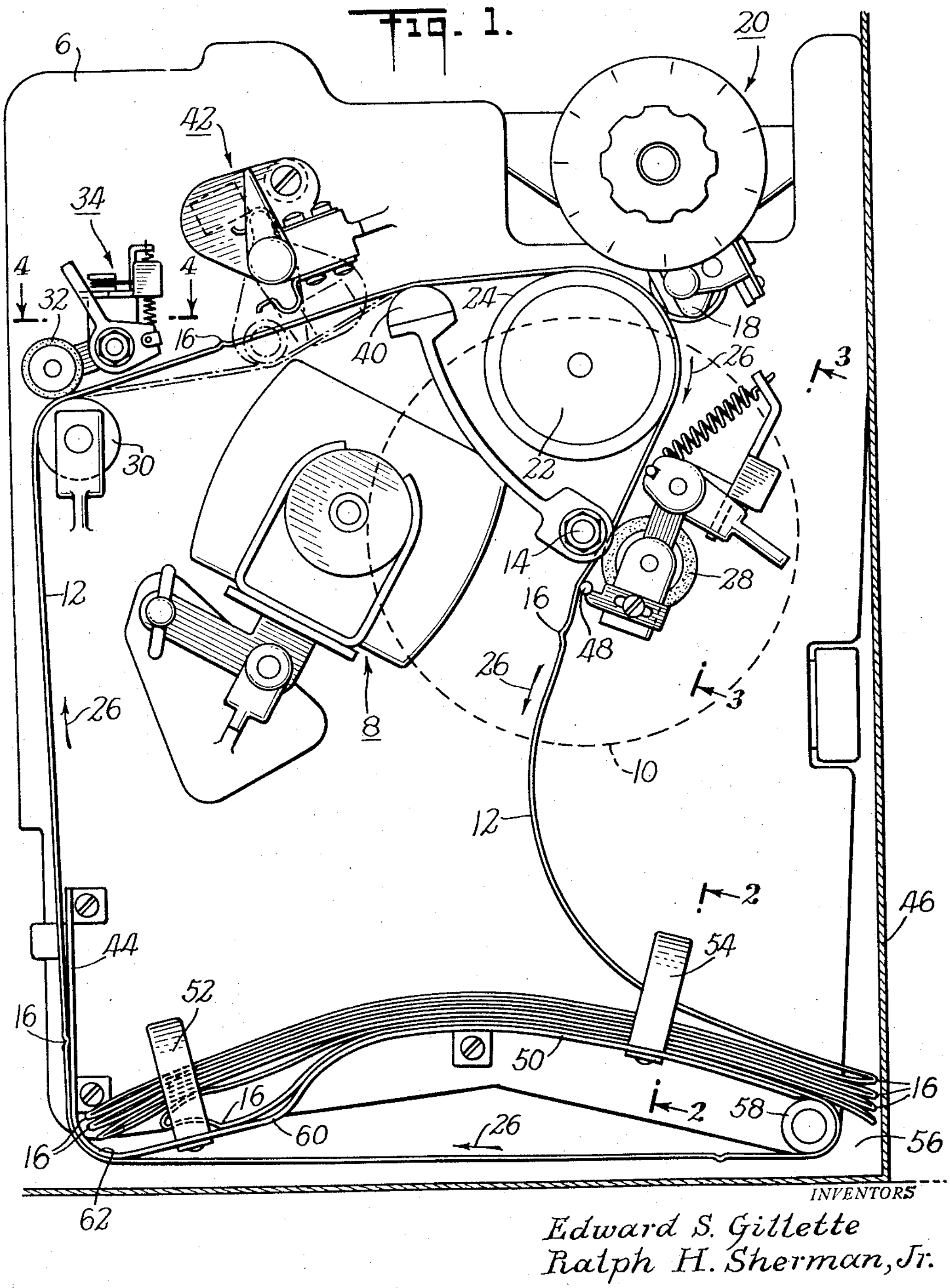
Figure 1 shows a side view of a sound recording machine provided with an endless magnetic belt record in accordance with an embodiment of the invention.
Figure 3:
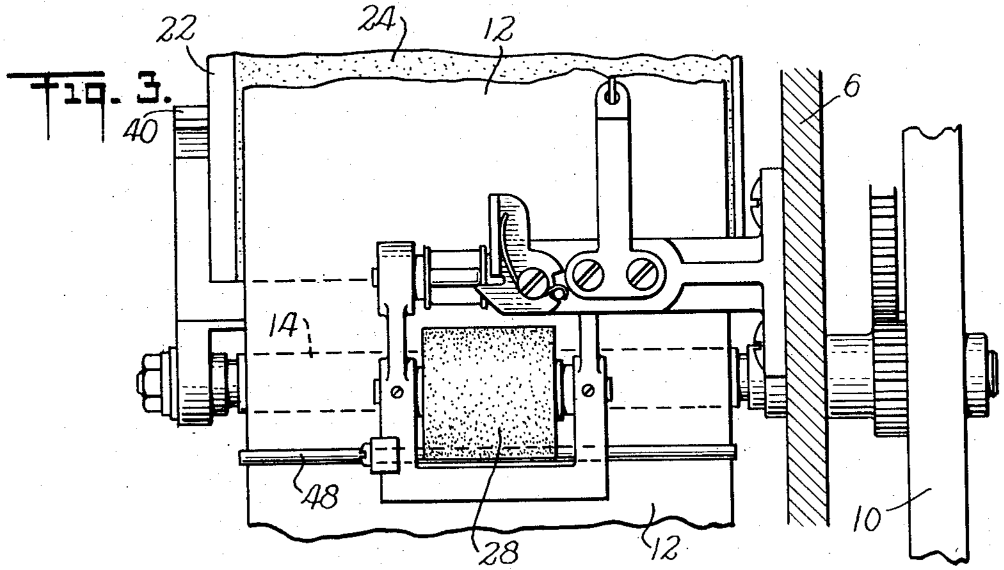
Figure 3 shows a portion of the belt record driving mechanism taken along line 3—3 of Figure 1.

Referring now in particular to the drawings, the illustrative embodiment of the invention shown in Figure 1 is a magnetic endless belt record machine having a frame 6 upon which a motor, generally indicated at 8, and other parts of the machine are mounted. This motor drives the rim of a flywheel 10 mounted on the back of the frame (see Figure 3). Flywheel 10 in turn drives an endless magnetic belt record 12 at constant speed by means of capstan roller 14 which is mounted on the shaft of the flywheel 10. Belt record 12, which is folded at evenly spaced creases 16 along its length so as to be adapted to fold into an accordion-pleated stack, is driven past a magnetic recording and reproducing head 18, which is moved slowly across the width of the record by a feeding mechanism, generally indicated at 20, thereby forming or following a helical record track. This feeding mechanism 20 is driven by motor 8 by appropriate gears (not shown) which may be like those well known in the art or like those shown in copending application Serial No. 437,762, filed June 18, 1954. Belt record 12, held firmly against head 18 by a rotating drum or anvil 22 having a resilient surface 24, is pulled in the direction of the arrows 26 by the capstan 14 which is pressed against the belt by a pressure roller 28. Roller 28, as can be seen in Figure 3, bears against only the middle portion of the record in order to prevent any irregularities in roller 14 from mis-aligning record 12 relative to head 18.

Figure 4:
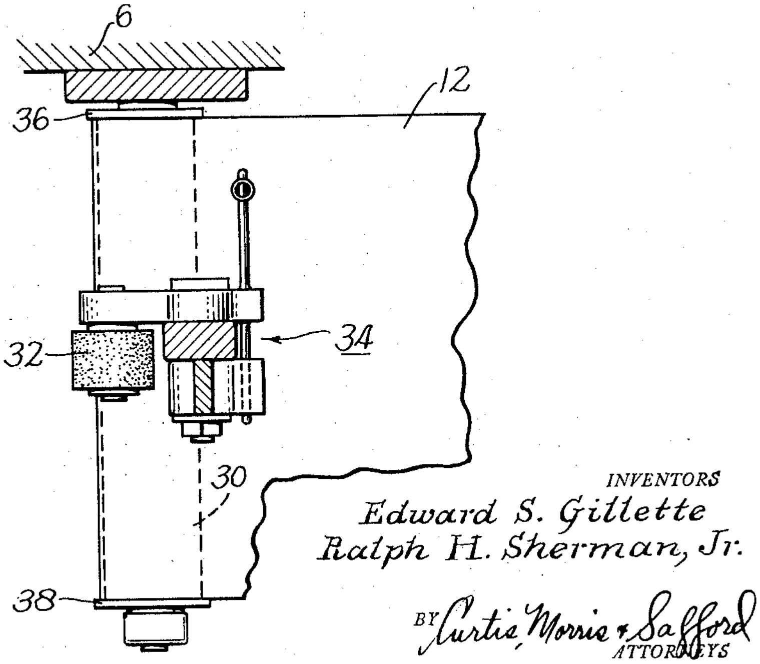
Figure 4 shows another portion of the belt record driving mechanism taken along line 4—4 of Figure 1.

Tension on this section of the record, which helps to insure uniform speed past the record head, is supplied by a brake roller 30 and an associated pressure roller 32 which is urged against the record by an adjustable spring-biased pressure-producing mechanism 34. Roller 30 is canted slightly relative to the record so that the latter, in passing over it, will ride against a particular one of its end flanges 36 or 38 (see Figure 4). This serves to align the record accurately with respect to record head 18. The braking force supplied by roller 30 can be obtained by viscous resistance or drag on its rotation but this force should be highly damped so that a constant tension on the section of the record to the right (in Figure 1) is maintained in spite of varying tension on the section to the left. The resulting tension on the right portion of the record should be sufficient in magnitude temporarily to flatten or straighten out each crease 16 in the record 12 as it passes under the record head 18. In addition to the action of this tension, further straightening of these creases 16 is provided by arm 40 which supports the record slightly out of line between roller 30 and drum 22. A magnetic erase head, generally indicated at 42 is mounted just to the left of arm 40 and can be engaged or disengaged as desired.

The creases 16 in belt record 12 are placed at regularly spaced intervals which are dependent upon the separation between an arm 44 of a record storage arrangement and a vertical wall 46 of the machine housing (not shown). These creases 16 are folded alternately in opposite sense to enable the record to assume naturally its folded, accordion-pleated arrangement when desired. To insure that each crease snaps back into form and becomes well defined after it passes rollers 14 and 28, a guide arm 48, which extends the width of belt record 12, is positioned beneath roller 28 so that a slight reverse bend is put in the record just as it leaves these rollers. Guide arm 48 is adjusted so that the record, as it passes downward, is properly inclined relative to a shelf or platform 50 of the record storage portion of the machine and folds itself thereon uniformly and evenly.

After leaving the record driving means just described, belt record 12 falls by gravity toward shelf or platform 50 fixed to frame 6, upon which it folds itself in a back and forth, or accordion-pleated, stack of layers. As the record continues to pass down beyond its position shown in Figure 1 its contact with the top layer on platform 50 progresses to the left until a crease 16, for example the one shown just below arm 48, reaches arm 44 which is a vertical continuation of the left end of shelf 50. When a crease reaches this point it causes the record to fall upon itself and to begin folding progress to the right. A similar reversal takes place at the right when the right hand creases in the record come to rest adjacent vertical wall 46. As the record is folding, it is further retained in a vertical stack of layers by pairs of slightly flared brackets 52 and 54 positioned near the left and right ends, respectively, of shelf 50. An appropriate amount of flare in the width between the arms of these brackets is shown in the cross-sectional view in Figure 2.

To permit continuous removal of record 12 from shelf 50 while the folding process just described is taking place, an opening 56 is provided between the right end of the shelf 50 and wall 46. This opening 56 is made wide enough to permit the easy withdrawal of the bottom layer of the record, but yet narrow enough to prevent the next layer from being withdrawn at the same time. A roller 58 is provided at the right end of shelf 50 to reduce friction on the record as it is being withdrawn. The radius of the roller surface, as with the width of opening 56, should be large enough to permit easy withdrawal of the belt record but yet small enough to prevent it from tangling. These two dimensions, which are interdependent, should be determined for best operation with the particular belt record used.

Figure 2:
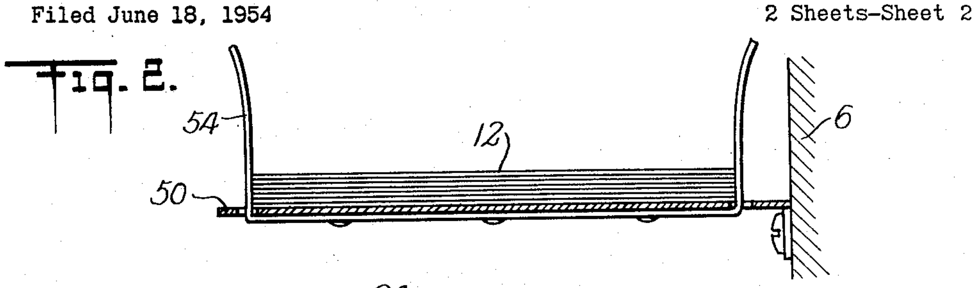
Figure 2 shows a sectional view of a portion of the belt record storage arrangement including a number of the record folds, taken on line 2—2 of Figure 1.

Shelf 50, as can be seen in Figure 2, is flat across its width and, as can be seen in Figure 1, curved along its length. The right half of the shelf is curved convexly upward and substantially uniformly while the left half is bent down in an S curve with the reverse bend at 60. The left end of shelf 50 is radially curved at 62 into its vertical continuation arm 44. This curved surface 62 acts to support the left ends of the belt record layers in the absence of support from the left center section of shelf 50. Thus the layers are able to remain arched above bend 60. By virtue of the free space between the layers and this bend, the left crease of the bottom layer can be straightened out or unfolded as the layer is being pulled to the right and in this way the record can be withdrawn through opening 56 evenly and without tangling. A particular advantage of this storage means is that the record need not be subject to any pushing force but rather folds and unfolds itself automatically.

As shown in Figure 1, record 12 is endless and, upon being withdrawn from the storage means through opening 56, is returned to the driving means around the bottom left end of shelf 50 up to roller 30 along the path already described. Record 12 may be moved past head 18 as many times as desired, but dependent upon the distance between adjacent signal tracks and the required width of such tracks. In a model of this embodiment of the present invention which actually has been built and tested, one hundred thirty-five parallel signal tracks were recorded on a belt record 3½ inches wide. The record, which was made of paper coated with a magnetic surface layer, fed evenly and without tangling through a withdrawal opening, corresponding to opening 56, of 5/16 of an inch and over a roller, corresponding to roller 58 of 9/32 of an inch in radius. The distance between creases 16 was made approximately 8½ inches so that the record could be folded and placed in an ordinary business envelope for mailing.

It should be understood that those elements, such as power supplies, mechanical drives, record head, erase head, etc., which are to be used in conjunction with a sound recording machine such as has been described above and which have not been set forth or described in detail may be any suitable elements or devices well known to the art. Their description has been omitted here because it is not necessary to an understanding of the present invention.

The above description is intended in illustration and not in limitation of the invention. It should be particularly understood that the invention is not limited to operation solely with records of the material or dimensions mentioned. In addition, various changes and modifications in the embodiment illustrated will occur to those skilled in the art and these changes and modifications may be made without departing from the spirit or scope of the invention as set forth.

What is claimed is:

1. In a record system, a tape record creased across its width at spaced intervals along its length, and storage means for storing in accordion-pleated form some length of said record, said storage means including a curved platform or shelf having a raised portion for part of its length and a depressed portion for another part of its length, said platform positioned beneath a moving part of said tape and adapted to receive and support some length of the tape in accordion-pleated form as the tape urged by gravity folds itself in layers upon said platform, said platform directly supporting the layers of said tape over roughly their right half and supporting a portion of their left half in a raised position over the depressed portion of said platform, whereby creases in said tape have free space to open as said tape is being withdrawn from said storage means.

2. The combination of elements as in claim 1 in which said platform supports the layers of said tape intermediate their left end and center in an archlike position over the depressed portion of said platform and in further combination with means defining a wall at the left end of said platform against which the left ends of said layers can abut and a generally vertical wall opposite the right end of said platform against which their right ends can abut at generally right angles, said latter wall being spaced a short distance from said platform to permit the bottom layer of said tape record to be withdrawn therebetween.

3. An endless belt record machine comprising a record head anvil, a constant speed drive roller positioned beyond said anvil for pulling an endless belt record past a record head, a record engaging roller opposite said constant speed drive roller and adapted to press the record against said roller with sufficient force to enable said drive roller to drive the record, said record engaging roller being adapted to engage approximately only the center third of the record, guiding means positioned beyond said constant speed driving roller and including an arm mounted transverse to the direction of the travel of the belt record and adapted to give it a slight reverse bend as it emerges from between said driving and record engaging rollers, a record storage platform positioned beneath said guiding means and adapted to receive and hold a number of layers of the belt record in accordion-pleated fashion, said platform having a high part and a low part along its length, the high part adapted directly to support the layers of said belt record from near one end to near their center and to hold them in arch-like position over the low part of said platform from near said center to near their other end so that free space is provided for creases in the bottom layer of the belt record to straighten out as the record is removed from said platform, narrow brackets spaced apart along said platform and adapted for supporting the sides of the layers of said belt record in a vertical stack, and means for guiding the bottom layer of said stack around the end of said platform and up to said record head anvil, said means including a rounded surface at the end of said platform and a vertical surface spaced opposite said rounded surface for holding the ends of the layers of said stack in vertical alignment as the bottom layer of the belt record is pulled around said rounded surface.

4. In a record machine adapted for use with a creased endless belt record in which a portion of said belt record is stored in accordion-pleated fashion while the remainder is driven past a record head, a record supporting platform adapted to receive said record and support a portion of it in accordion-pleated somewhat arched horizontal layers in a vertical stack, said platform having a width substantially equal to the width of said record and being flat across its width, the right half of said platform being slightly curved convexly upward in a smooth curve along its length, a portion of the left half of said platform being depressed below the right half, the leftmost end of said platform being rounded and continued upward in a vertically extending arm, the right end of said platform being rounded to permit withdrawal around and beneath it of the bottom layer of said belt record, a surface generally parallel to said vertical extending arm and spaced adjacent the right end of the platform a distance from said vertically extending arm that is slightly less than the distance between successive creases in said belt record, whereby the layers of said belt record are supported by said platform in arched position over the depressed portion and can be withdrawn layer by layer without tangling.

5. The combination of elements as in claim 4 in further combination with a bracket attached to said platform and having vertically extending arms spaced apart approximately the width of said record and adapted to hold the layers of said record in a vertical stack, said bracket being flared slightly apart at its top to permit easy insertion of the record layers between it, the width of said arms being much less than the length of said platform.

6. In a record machine adapted for use with a creased endless belt record in which a portion of said belt record is stored in accordion-pleated fashion while the remainder is driven past a record head, a record supporting platform adapted to receive said record and support a portion of it in accordion-pleated horizontal layers in a vertical stack, one portion of the length of said platform being inclined slightly upward from its outer end toward the center, said outer end being rounded to permit withdrawal of said record around said end and beneath said platform, the other portion of the length of said platform lying in part below a mirror image of said one portion to provide a free space beneath the bottom layer of said record and said platform, and support means at each end of said platform to keep the layers of said record from shifting endwise, there being a narrow opening opposite the rounded end of said platform and beneath the ends there of said record layers, whereby said record can be withdrawn through said opening around said rounded end layer by layer without tangling, and creases in said record can unfold in said free space.

References Cited in the file of this patent

UNITED STATES PATENTS

| | | |
|---|---|---|
| 2,542,506 | Gibson | Feb. 20, 1951 |
| 2,551,198 | Barret | May 1, 1951 |
| 2,606,766 | Kuhlik | Aug. 12, 1952 |
| 2,679,394 | Lear | May 25, 1954 |